US008281286B2

(12) United States Patent
Nguyen

(10) Patent No.: US 8,281,286 B2
(45) Date of Patent: Oct. 2, 2012

(54) METHODS AND SYSTEMS FOR AUTOMATED TESTING OF APPLICATIONS USING AN APPLICATION INDEPENDENT GUI MAP

(75) Inventor: Dung H. Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1645 days.

(21) Appl. No.: 11/396,064

(22) Filed: Mar. 31, 2006

(65) Prior Publication Data

US 2007/0234127 A1    Oct. 4, 2007

(51) Int. Cl.
    G06F 9/44    (2006.01)
(52) U.S. Cl. ............. 717/125; 717/113; 717/124
(58) Field of Classification Search .......... None
    See application file for complete search history.

(56) References Cited

U.S. PATENT DOCUMENTS

| | | | |
|---|---|---|---|
| 6,378,088 B1* | 4/2002 | Mongan | 714/39 |
| 6,502,102 B1* | 12/2002 | Haswell et al. | 1/1 |
| 6,993,748 B2* | 1/2006 | Schaefer | 717/124 |
| 7,213,230 B2* | 5/2007 | Harel et al. | 717/113 |
| 7,290,245 B2* | 10/2007 | Skjolsvold | 717/125 |
| 7,519,921 B2 | 4/2009 | Raghavan et al. | |
| 7,900,192 B2* | 3/2011 | Patterson | 717/125 |
| 7,917,895 B2* | 3/2011 | Givoni et al. | 717/124 |
| 2002/0091968 A1* | 7/2002 | Moreaux et al. | 714/38 |
| 2003/0005413 A1* | 1/2003 | Beer et al. | 717/125 |
| 2003/0055836 A1* | 3/2003 | Dubovsky | 707/102 |
| 2004/0107415 A1* | 6/2004 | Melamed et al. | 717/124 |
| 2005/0204343 A1* | 9/2005 | Kisamore et al. | 717/124 |
| 2005/0229161 A1* | 10/2005 | Wang et al. | 717/125 |
| 2006/0095894 A1* | 5/2006 | Wilde et al. | 717/113 |
| 2009/0070742 A1* | 3/2009 | Voruganti | 717/124 |

OTHER PUBLICATIONS

Memon et al. Hierarchical GUI test case generation using automated planning, IEEE Transactions on Software Engineering, Feb. 2001, pp. 144-155, Retrieved on [May 30, 2012] Retrieved from the Internet: URL<http://ieeexplore.ieee.org/stamp/stamp.jsp?tp=&arnumber=908959>.*
Paiva et al. A Model-to-Implementation Mapping Tool for Automated Model-Based GUI Testing, Lecture Notes in computer Science, 2005 Retrieved on [May 30, 2012] Retrieved from the Internet: URL<http://www.springerlink.com/content/3276718345v86627/fulltext.pdf>.*
Mercury Interactive Inc., WinRunner. http://www.mercury.com/us/company, Jun. 3, 2004; last updated Mar. 8, 2005.
Pettichord, Bret "Deconstructing GUI Test Automation," Article printed in Issue of Jan./Feb. 2003, STQE Magazine.
Nguyen, Dung "Test Automation Framework," EDCS-326056, last updated Feb. 24, 2004.

(Continued)

Primary Examiner — Thuy Dao
Assistant Examiner — Cheneca Smith
(74) Attorney, Agent, or Firm — Lempia Summerfield Katz LLC

(57) ABSTRACT

Methods and systems for the automated testing of applications using an application independent GUI map are disclosed. A method includes receiving a command to change a physical description of an object of a general class in the GUI map. A physical description of the object of general class is changed in the GUI map to correspond to a specific object in a particular application. A request is received to identify the specific object in the particular application using a physical description of the specific object. The specific object is associated with the physical description of the specific object. Access is provided to the physical description of the specific object.

12 Claims, 17 Drawing Sheets

OTHER PUBLICATIONS

Nagle, Carl J. "Test Automation Frameworks," http://safsdev.sourceforge.net/DataDrivenTestAutomationFrameworks.htm; Dec. 30, 2002.

Pettichord, Bret "Success with Test Automation," Paper presented at Quality Week, San Francisco, May 1996, http://www.io.com/~wazmo/succpap.htm; revised Jun. 28, 2001.

* cited by examiner

| Logical Name | Physical Description |
|---|---|
| Autentication | {<br>  class: window,<br>  label: Authentication,<br>  Mic_if_handles_windows: 1<br>} |
| level_15_access on "172.2... | {<br>  class: static_text,<br>  label: "\"level_15_access\" on \"172.20.80.159\":"<br>} |
| Cancel | {<br>  class: push_button,<br>  label: Cancel<br>} |
| OK | {<br>  class: push_button,<br>  label: OK<br>} |
| Password: | {<br>  class: edit,<br>  attached_text: "Password:"<br>} |
| Password:(st) | {<br>  class: static_text,<br>  label: "Password:"<br>} |
| Please enter your username ... | {<br>  class: static_text,<br>  label: "Please enter your username and password for realm"<br>} |
| Username: | {<br>  class: edit,<br>  attached_text: "Username:"<br>} |
| Username:(st) | {<br>  class: static_text,<br>  label: "Username:"<br>} |

Figure 1C

| Name | Access Method |
|---|---|
| Username | textbox#1 |
| Password | textbox#2 |
| OK | button#1 |
| Cancel | button#2 |

| Logical Name | Physical Description |
|---|---|
| Application | {<br>class: window,<br>label: Authentication,<br>mic_if_handles_windows: 1<br>} |
| cButton | {<br>class: check_button,<br>label: "Read/Write"<br>} |
| editBox | {<br>class: edit,<br>attached_text: "Password:"<br>} |
| link | {<br>class: object,<br>MSW_class: html_text_link,<br>html_name: Movies,<br>location: 0<br>} |
| listBox | {<br>class: list,<br>attached_text: "Date"<br>} |
| menu | {<br>class: menu_item,<br>label: "Tools"<br>} |
| object | {<br>class: object,
class_index: 2<br>} |

From Figure 2C

```
pButton         {
                  class: push_button,
                  label: Cancel
                }
rButton         {
                  class: radio_button,
                  label: "Remember my
                  password"
                }
spin            {
                  class: spin,
                  class_index: 3
                }
tab             {
                  class: tab,
                  attached_text: "Configuration"
                }
table           {
                  class: table,
                  attached_text: "Hostname"
                }
text            {
                  class: static_text,
                  label: "Virtual GUI Map"
                }
```

Figure 2C Continued

| Keyword | Argument |
|---|---|
| clickButton | button_label |
| clickCheckButton | button_label |
| clickLink | link_label |
| clickMenu | menu^submenu1^..^node |
| clickMenuBar | menu^submenu1^..^node |
| clickObject | {object_label \| index} |
| clickTab | Tab |
| closeWindow | window_label |
| Comment | |
| enterTableText | table^row_label^col^text |
| enterText | editbox^text |
| Exit | |
| gotoWindow | window_label |
| invokeApp | application^command_lin_argument |
| launchUrl | browser^url |
| Login | {app\|box^userid^password} |
| Logout | |
| maximizeWindow | window_label |
| minimizeWindow | window_label |
| resizeWindow | window_label^width^height |
| restoreWindow | window_label |
| selectListItem | list^item |
| selectTableCol | table^col |
| selectTableRow | table^row |
| sendCmd | tcl_file^ip address |
| setCheckBox | checkbox^state |
| setComboBox | combobox^item |
| setRadioButton | button^state |
| setTableCheckbox | table^row_label^col_header^state |
| verifyButtonExist | button_label |
| verifyCheckboxState | checkbox^expected_status |
| verifyColorExist | object_type^object_label^expected_color |
| verifyEditbox | editbox^expected_string |
| verifyListItem | list^item |
| verifyMenuExists | yesno^menu |
| verifyTabExist | tab_name |
| verifyTable | table^row#^col# |
| verifyTableData | table^datafile^key^exclude |
| verifyTableHeader | table^table_header |
| verifyTextExist | text |
| Waitfor | object_type^label |

Figure 2E

| Test Case | Description | Explanation |
|---|---|---|
| C:\TAF\ TAF_TestCases\ testcase001.txt | launch http://172.19.253.176/ccc:<br>login application (admin,admin);<br>click Wizard;<br>logout;<br>exit; | Login to and logout from the application testing. |
| C:\TAF\ TAF_TestCases\ testcase002.txt | launch http://172.19.253.199/ccmadmin;<br>login box (administrator,cisco);<br>click Service<Media Resource->Transcoder;<br>exit; | Login to the application via a login dialog box. |
| C:\TAF\ TAF_TestCases\ testcase003.txt | repeat admin006 to admin009<br>launch http://172.19.253.199/ccmadmin;<br>login box (administrator,cisco);<br>click User<Add a New User;<br>addUserToCCM<br>(admin006.admin006,admin006,12345,12345<br>);<br>rend;<br>exit; | Add 5 users including admin006, admin007, admin008 and admin009 to the application (Cisco CallManager). |
| C:\TAF\ TAF_TestCases\ testcase004.txt | repeat 3<br>launch http://172.19.253.199/ccmadmin;<br>login box (administrator,cisco);<br>rend;<br>exit; | Login to the application via a login dialog box, as administrator.<br>Repeat that for 3 times. |
| C:\TAF\ TAF_TestCases\ testcase005.txt | launch http://172.19.253.198/ccmadmin;<br>login application (ccmadministrator,cisco);<br>click System<Enterprise Parameters;<br>if listbox(2) equal True;<br>set listbox(2) to False;<br>click button Update;<br>endif;<br>exit; | Login to the application and change value of the parameter to False if it was True. |
| C:\TAF\ TAF_TestCases\ testcase006.txt | launch http://172.19.253.198/ccmadmin;<br>login application (ccmadministrator,cisco);<br>click System<Enterprise Parameters;<br>if listbox(2) equal True;<br>set listbox(2) to False;<br>click button Update;<br>else;<br>click System<Server;<br>logout;<br>endif;<br>exit; | Login to the application and change value of the parameter to False if it was True; otherwise, go to Server page and logout. |

Figure 2F

METHODS AND SYSTEMS FOR AUTOMATED TESTING OF APPLICATIONS USING AN APPLICATION INDEPENDENT GUI MAP

TECHNICAL FIELD

Embodiments of the present invention pertain to methods and systems for automated testing of applications using an application independent GUI map.

BACKGROUND ART

In recent years graphical user interface (GUI) test automation has advanced from record and play to data driven GUI test automation. Through these advances test automation systems have become more user-friendly and have improved in efficiency. The improved systems allow scripts to be reused and allow individuals without programming experience to create and execute scripts. Many of the current systems enable superior software to be developed more quickly than was previously possible. One area of GUI test automation that continues to see advances is GUI map management.

GUI maps are important for any test automation system. GUI maps allow objects to be mapped from names that test automation system testers recognize to data formats that automation tools can understand. GUI maps contain logical names and physical descriptions of objects in corresponding applications. FIG. 1A shows a typical authentication window associated with an application program. A conventional type GUI map of the authentication window shown in FIG. 1A is shown in FIG. 1B. Correspondences between the logical names and the physical descriptions of the objects associated with the authentication window are shown in FIG. 1C.

It should be appreciated that when tests are run, the automation tool reads statements, which contain logical names of objects located in the GUI and searches the GUI map for the logical names. The logical names point the tool to the physical description of the object in the GUI map. Using the physical descriptions to locate the position of the object in the GUI, the tool can easily find the matched objects. For example, to perform the login, the following code can be used:

set_window("authentication"5)
    edit_set("username:", "tester1")
    edit_set("password:", "12345")
    button_press("OK")

In a conventional automated system such as that discussed with reference to FIGS. 1A-1C, all objects associated with a window are listed under that window's description (see FIG. 1A, the corresponding GUI map of FIG. 1B, and the corresponding physical descriptions of FIG. 1C). The different windows that appear in a particular application are listed in the GUI map for that application as shown in FIG. 1D.

Conventional test automation systems have serious shortcomings. Most conventional systems allow considerable latitude in mapping of objects. It should be appreciated that each map corresponding to particular applications need modification once a change in the application is made. Additionally, to accommodate different applications, the automated test system has to use different maps. Managing the necessary changes and maps involved is a considerable challenge.

Shortcomings of the conventional systems can be exposed when changes to the application are made in development. Examples of types of changes that could be made to the window shown in FIG. 1A during development that could affect it's GUI map are for instance, a change in the first edit box to "UserID" from "Username:" or in the "OK" button to "login". Such changes in the application involve corresponding modifications to the associated GUI map. It should be appreciated that such changes can be expected to occur more than once before a product releases.

The window map shown in FIG. 1E is a table of all objects with their appropriate accessing method. This approach attempts to help the scripter to avoid having to map objects to specific window elements. However, this approach involves all objects being scanned. Additionally, it only helps during mapping, and still needs to be modified if there is any change in an application after the table is established.

Another problem occurs when old scripts are reused with different applications as is customary with most test automation systems. Since each application has its own arrangement of windows and objects, their respective GUI maps are different. With conventional approaches a GUI map has to be maintained for each application. Consequently, if 100 applications are served 100 GUI maps must be maintained. As such, existing GUI maps cannot be immediately used with new applications; a revised GUI map must be created.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1C shows a table with correspondences between the logical names and the physical descriptions of the objects associated with an authentication window.

FIG. 2C shows an expanded list of physical descriptions (class of object and label) of the general types of objects that are found in an application independent GUI map and their corresponding logical names according to one embodiment of the present invention.

FIG. 2E shows an exemplary list of keywords and their corresponding arguments according to one embodiment of the present invention.

FIG. 2F shows examples of test cases that can be employed as diagnostics in the testing of application programs according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer system, server system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

Figure 1A:
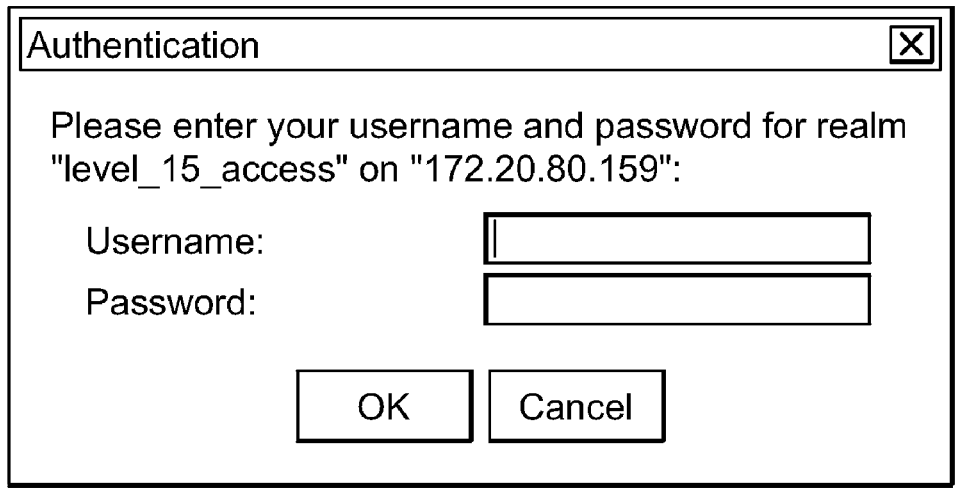
FIG. 1A shows a typical authentication window associated with an application program.
Figure 1B:
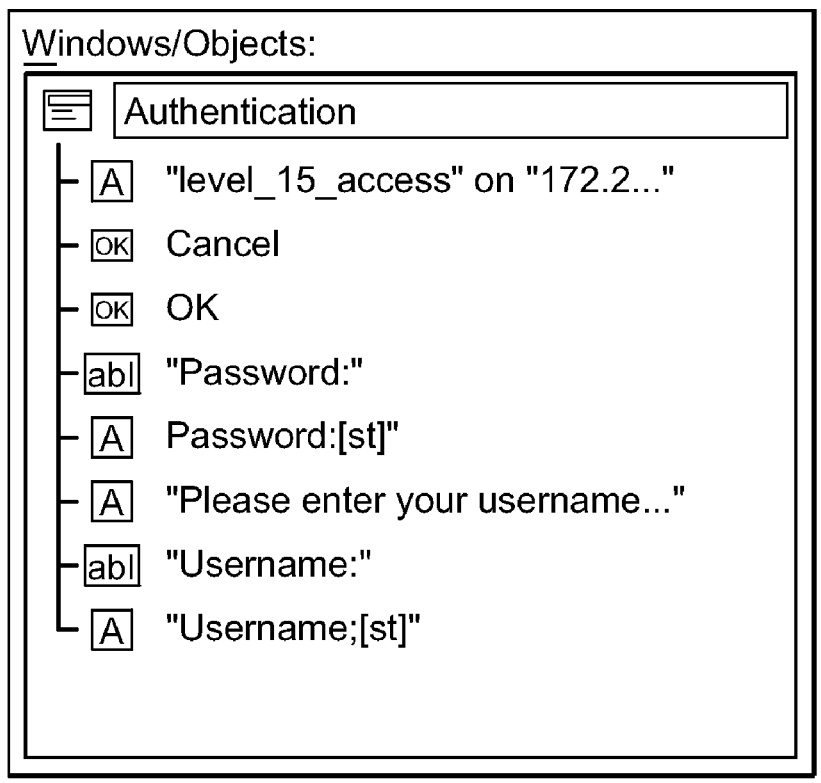
FIG. 1B shows a conventional type GUI map of the authentication window shown in FIG. 1A.
Figures 1D, 1E:
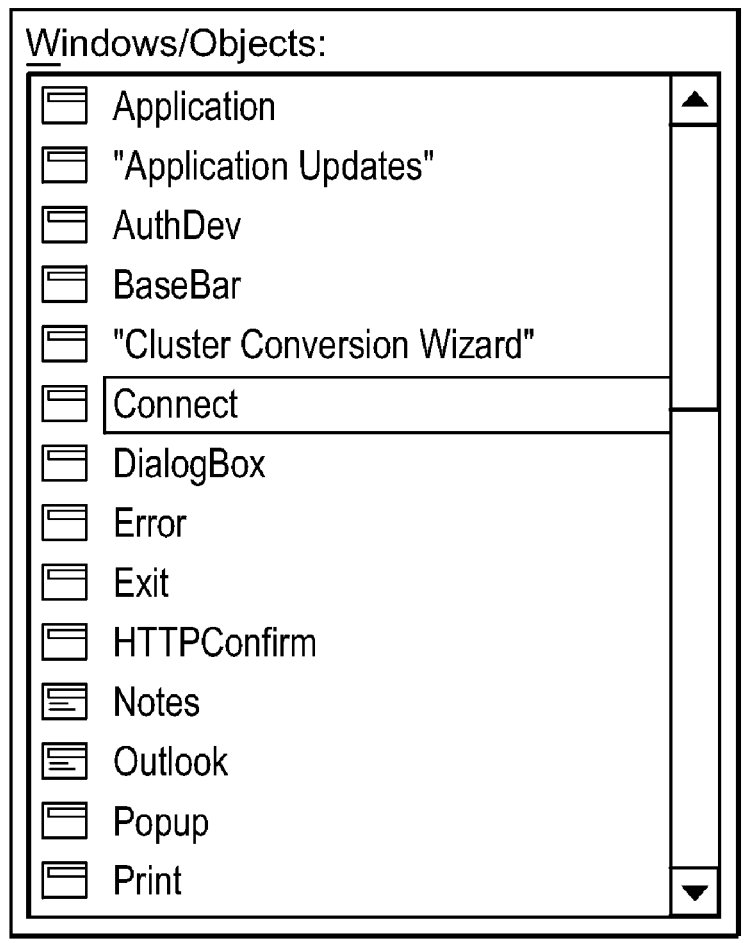
FIG. 1D shows a GUI map with the respective windows that appear in a particular application.
FIG. 1E shows a window map with a table of all objects in the window map and their appropriate accessing method.
Figure 2A:
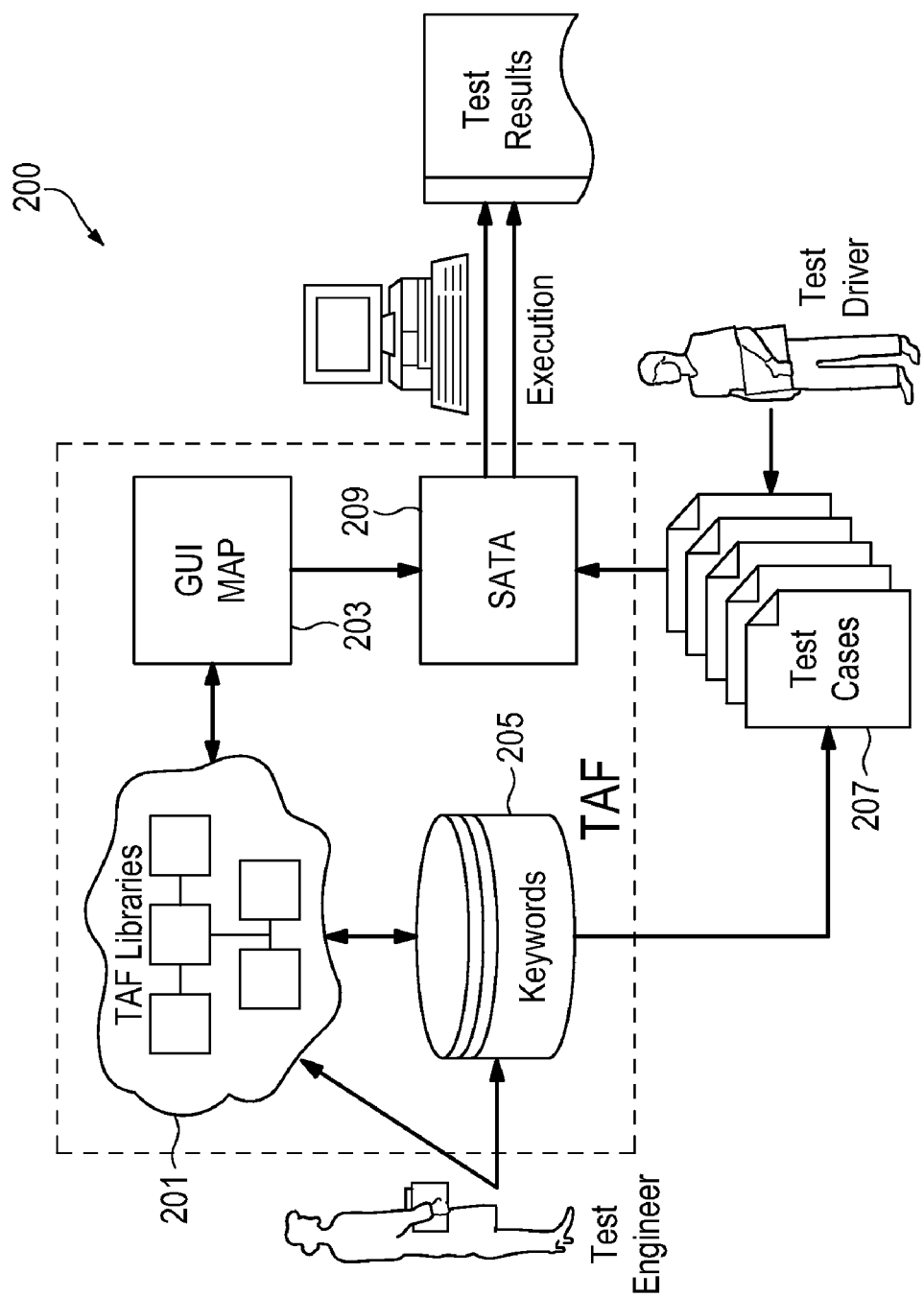
FIG. 2A shows the architecture of an automated application-program testing platform according to one embodiment of the present invention.

Architecture of an Automated Testing Platform According to Embodiments of the Present Invention FIG. 2A shows the architecture of an automated application-program testing platform 200 according to one embodiment of the present invention. In one embodiment, an application independent GUI map 203 that can be used with any application can be employed to map objects in an application. Based on application independent GUI map 203, automated testing of any application either original or revised can be executed. In the FIG. 2A embodiment, automated test platform 200 includes automated test libraries 201, application independent GUI map 203, keywords 205, test cases 207, and system (SATA) 209 for automated testing of applications.

Referring to FIG. 2A, automated test libraries 201 include a set of functions and common utilities that are associated with particular applications. In one embodiment, automated test libraries 201 can contain modularized libraries, which can understand and execute test cases written in predefined text format. In one embodiment, the libraries can be application independent.

Application independent GUI map 203 contains mappings associated with general objects. In one embodiment, application independent GUI map 203 can be used in testing of any type application whether original or revised. In one embodiment, this is accomplished by including in the GUI map each class of object generally found in program applications and then using an object of a particular class in testing operations for each instance necessary where appropriate for a particular program application.

For example, if an edit box is used in the GUI of a particular application program to enter a user name and password, then the edit box can be used to first accommodate the entry of the username and subsequently to accommodate the entry of the password. The username and password entry operations can be identified by reference to the edit box in combination with an attribute that is unique to either the username or the password.

Figure 2B:
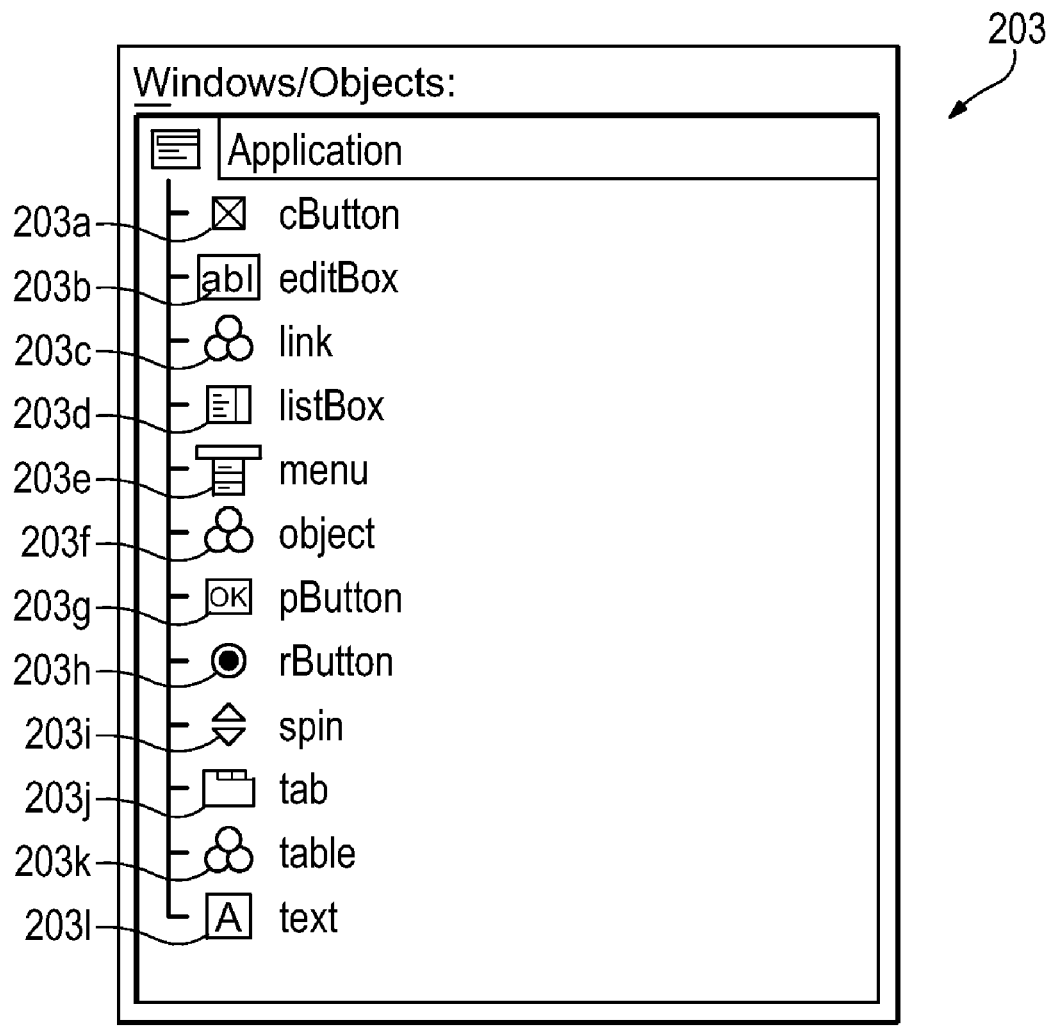
FIG. 2B shows a graphical representation of application independent GUI map that displays icons representative of the classes of objects that are included in the application independent GUI map according to one embodiment of the present invention.

FIG. 2B shows a graphical representation of application independent GUI map 203 that displays icons representative of the classes of objects that can be included in the application independent GUI map. In one embodiment, GUI map 203 includes check button 203a, edit box 203b, link 203c, list box 203d, menu 203e, object 203f, press button 203g, radio button 203h, spin 203i, tab 203j, table 203k and text 203l. As shown in FIG. 2B, only general classes of objects which are used in all applications and which therefore are not application dependent are included in GUI map 203.

Figure 2D:
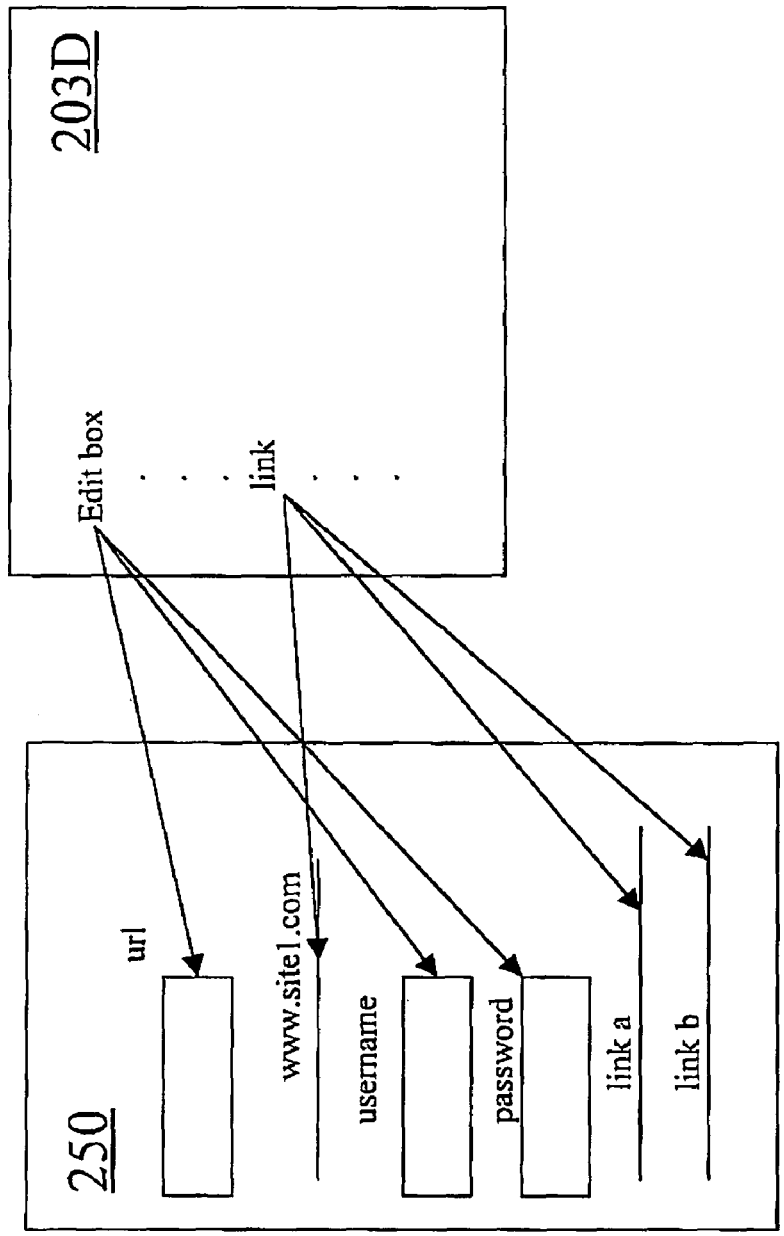
FIG. 2D illustrates how objects located in a program application are mapped using an application independent GUI according to one embodiment of the present invention.

FIG. 2C shows an expanded list of physical descriptions (class of object and label) of the general types of objects that are found in an application independent GUI map and their corresponding logical names according to one embodiment of the present invention. Referring to FIG. 2C, a logical name is associated with a physical description (edit box, link, etc.) of the object located in the application independent GUI map (e.g., 203) and a unique attribute (e.g., attached text, label, etc.) which it is designated to correspond. FIG. 2D illustrates how objects located in a program application GUI are mapped using an application independent GUI map. As is shown in FIG. 2D, in one embodiment, an application independent GUI map 203D that contains an object that corresponds to each class of object located in GUI 250, maps the objects in GUI 250 by relating the objects in GUI 250 to the object in GUI map 203D that shares its class description (e.g., edit box, link etc.) In exemplary embodiments, as is shown in FIG. 2D, the same object in GUI map 203D can be used to identify and locate particular objects in GUI 250 and accommodate test operations using different objects in GUI 250. In one embodiment, this is done by associating the object in GUI 250 with the object in GUI map 203D that has the same class through the use of a physical description of its class and knowledge of an attribute of the particular object in GUI 250. In one embodiment, the attribute can be a physical description (e.g., index, text, title, etc.) that enables the test driver to identify a specific object in GUI 250 that is being used to execute an operation specified by a keyword that is a part of a test case. As is shown in FIG. 2D, titles can be used as part of the physical description identifier that enables the test driver to identify a specific object in GUI 250 using a single object of a general class in the GUI map 203D (see edit box and link in GUI map 203D).

Referring again to FIG. 2A, keywords 205 are words that specify application operations that are tested in the execution of test cases. In one embodiment, keywords can specify operations that are most commonly used in conjunction with application use. For example, the keyword 'launch' is most commonly used to launch a page using a specific url address. In one embodiment, keywords can be non-case sensitive. For example, 'launch' and 'Launch' can be considered to be identical. FIG. 2E shows an exemplary list of keywords and their corresponding arguments.

Test cases 207 contain a schedule or series of program application operations that are tested as a part of an automated test. In one embodiment, test cases are created using keywords 105. Each keyword can entail one or more operations and involve one or more objects (see FIG. 2D). Below is an example test case that tests a login feature of an application according to one embodiment:

(1) launch http://172.19.253.205
(2) login application
(3) click Wizard
(4) logout
(5) exit The above test case entails: (1) a launch of an application through the selection of a specified url address: http://172.19.253.205/ccc (involving the identification of the correct edit box in the GUI to accommodate entry of the url in the application), (2) a login into the application with a given ID of a particular user and appropriate password (involving the identification of the correct edit boxes in the GUI to accommodate entry of the user ID and password in the application) (3) a logout of the application, and (3) a termination of the test. It should be appreciated that keywords include "launch", "login application", "click wizard", "logout" and "exit". Each of these keywords involve an identification of objects in the GUI that are used to accommodate the execution operations associated with the keywords. In one embodiment, these objects are located as is described above with reference to FIG. 2D. FIG. 2F shows example of test cases that can be employed as diagnostics in the testing of application programs.

Referring once again to FIG. 2A, as discussed above, SATA 209 drives the execution of test cases using an application independent GUI map 203. As a part of its operations SATA 209: (1) accesses a test case that comprises keywords, (2) determines the specific objects of a GUI involved in the performance of operations associated with a keywords that are a part of the test case and, using the application independent GUI map, identifies the specific objects in the application, and (3) based on (1) and (2) directs the performance of each operation specified in the test cases.

Stated differently, SATA 209 directs a listing, reading, parsing and execution of each test case. In one embodiment, SATA 209 allows the testing of a variety of different types of applications. Moreover, in one embodiment, SATA 209 allows the testing of any type of program application.

In operation, as illustrated in FIG. 2A, a test creator can provide keywords from which test cases are made. These keywords can be used in conjunction with functions and common utilities that are maintained in library 201. When a test case is to be executed, SATA 209 accesses the test cases and uses the application independent GUI map 203 in directing the execution of the cases. As discussed above application independent GUI map 203 can contains one or more of each class of object generally found in program applications. Moreover, a single object in the GUI map 203 can be used in the execution of each operation that involves an object of its class in a test case.

Figure 3A:
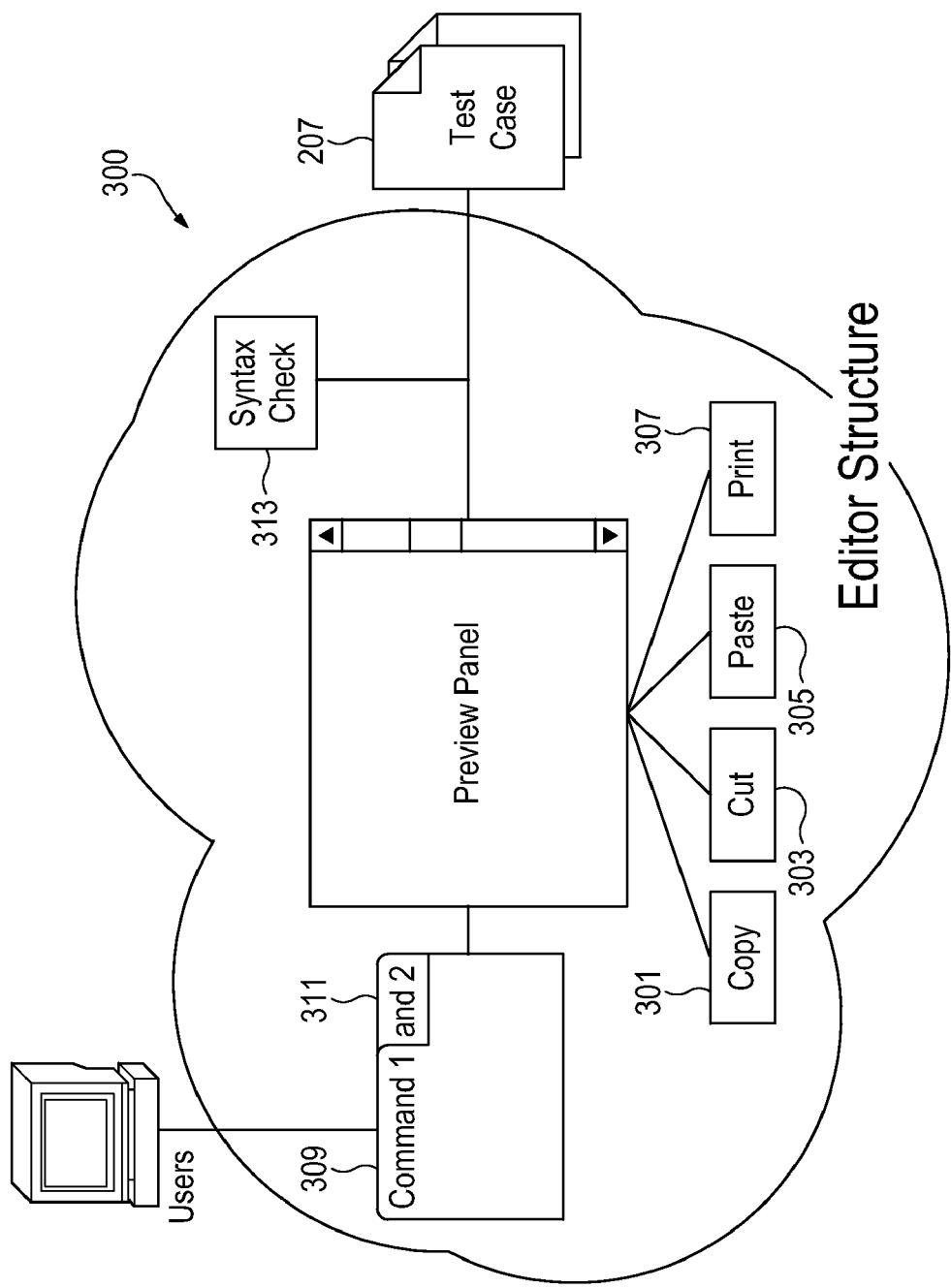
FIG. 3A shows an exemplary editor structure that can be used in conjunction with system for the automated testing of applications using an application independent GUI map according to one embodiment of the present invention.
Figure 3B:
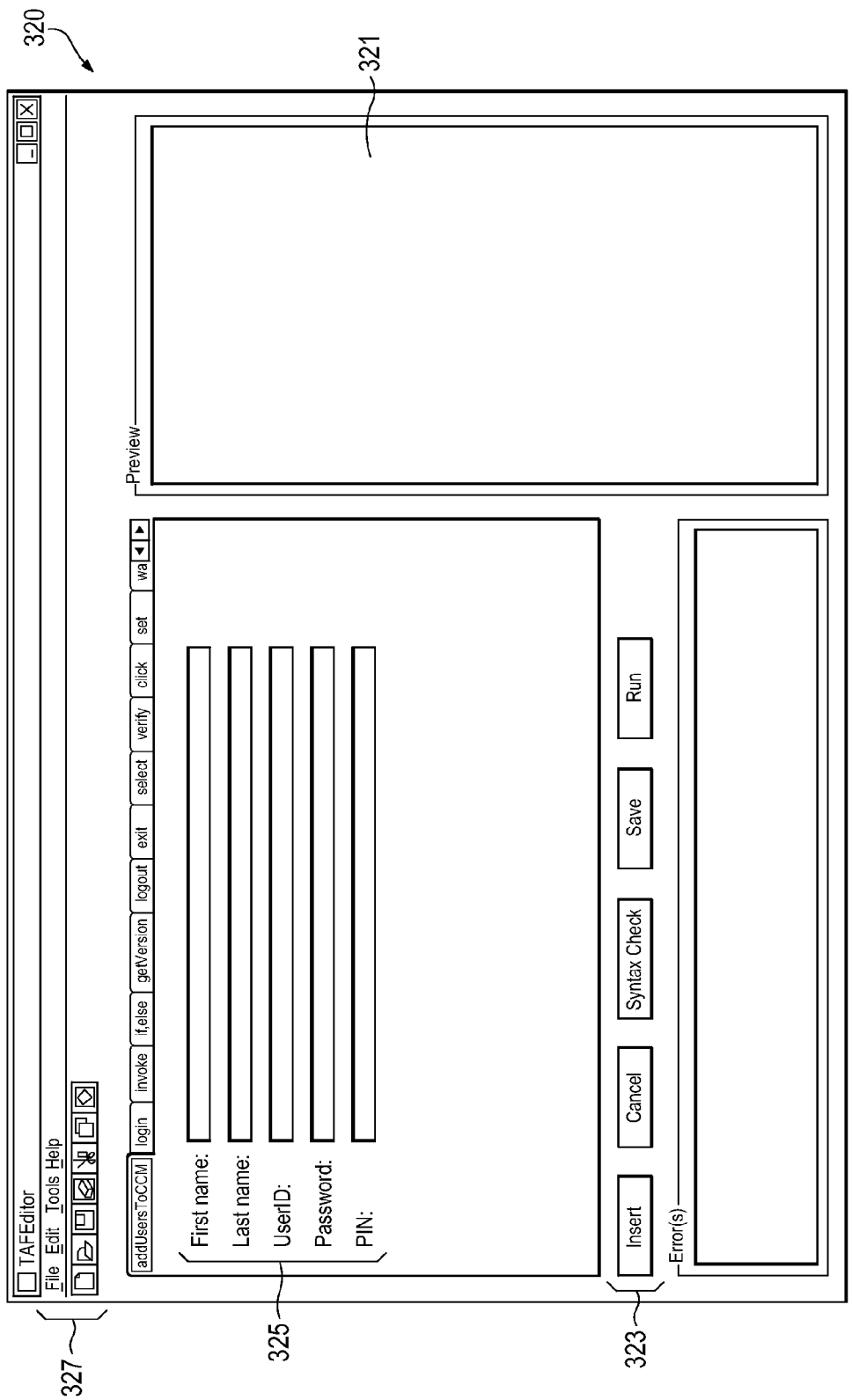
FIG. 3B shows an illustration of an exemplary editor GUI according to one embodiment of the present invention.

FIG. 3A shows an exemplary editor structure 300 that can be used in conjunction with system 209 for the automated testing of applications using an application independent GUI map according to one embodiment of the present invention. In one embodiment, editor structure 300 enables users to write test cases 207 without memorizing keywords. In one embodiment, copy 301, cut 303, paste 305 and print 307 function/buttons can be used to construct test cases as a series of commands 309 and 311. In one embodiment, the test cases can be subjected to a syntax check 313. FIG. 3B shows an illustration of an exemplary editor GUI 320 according to one embodiment of the present invention. The editor includes typical data input and control mechanisms 321, 323, 325 and 327.

Figure 4:
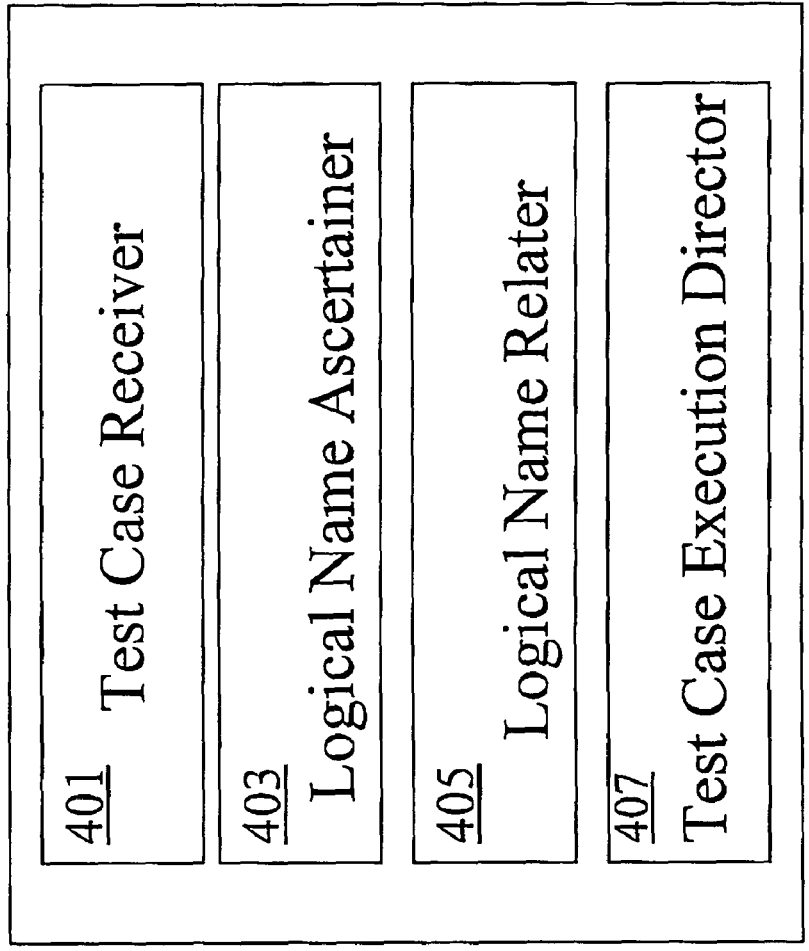
FIG. 4 shows components of a system for the automated testing of applications using an application independent GUI map according to one embodiment of the present invention.

System for Automated Testing of Applications Using an Application Independent GUI Map According to One Embodiment of the Present Invention FIG. 4 shows components of system 209 for the automated testing of applications using an application independent GUI map (e.g., 203 in FIG. 2A) according to one embodiment of the present invention. In one embodiment system 209 manages the testing of individual program-applications using an application independent GUI map (e.g., 203 in FIG. 2A) that can be used across various program-applications. In the FIG. 4 embodiment, components of system 209 include test case receiver 401, logical name ascertainer 403, and operation executor 405. It should be appreciated that the components of system 209 can be implemented in hardware or in software or in a combination of both.

Referring to FIG. 4, test case receiver 401 receives test cases that are constituted by keywords. It should be appreciated that test case receiver can receive test cases that correspond to one or more program applications. It should be appreciated that each test case can be devised to test the operation of individual program-applications, or components thereof. In one embodiment, the test cases can be devised by users of the system. In one embodiment, keywords correspond to operations that are performed during the course of a test case.

Logical name ascertainer 403 ascertains the logical names that are included in the test cases. In one embodiment, the logical names are identified and supplied to logical name relater 405.

Logical name relater 405 relates the logical names that are ascertained to a general class description of objects in the application and the application functions to which they correspond. In one embodiment, logical name relater 405 performs this function based on an application independent GUI map (e.g., 203 in FIG. 2A). In one embodiment, the application independent GUI map can contains an object of each class of object generally found in program applications.

Operation executor 407 directs the execution of each operation specified by the keywords of the test cases that are received by test case receiver 401. In one embodiment, operations can be executed using objects in the GUI that are identified using a class description of the object located in an application independent GUI map (e.g., 203 in FIG. 2A). In one embodiment, an object in the application independent GUI map can be used in the execution of each operation that involves an object of its class in a test case.

In one embodiment, the test cases test the functionality of one or more program applications, or components thereof. In one embodiment, test cases can be based upon test script that is constituted by functions associated with the keywords. In one embodiment, keywords correspond to operations that are performed in the test cases. In one embodiment, test cases are formulated by a user of the automated test platform associated with system (e.g., 209 in FIG. 2A). In one embodiment, cases can be submitted by a user via a graphical editor.

In one embodiment, objects can include but are not limited to check button, edit box, link, list box, menu, object, press button, radio button, spin, tab, table and text. In one embodiment, applications tested can include commercially available software.

Figure 5:
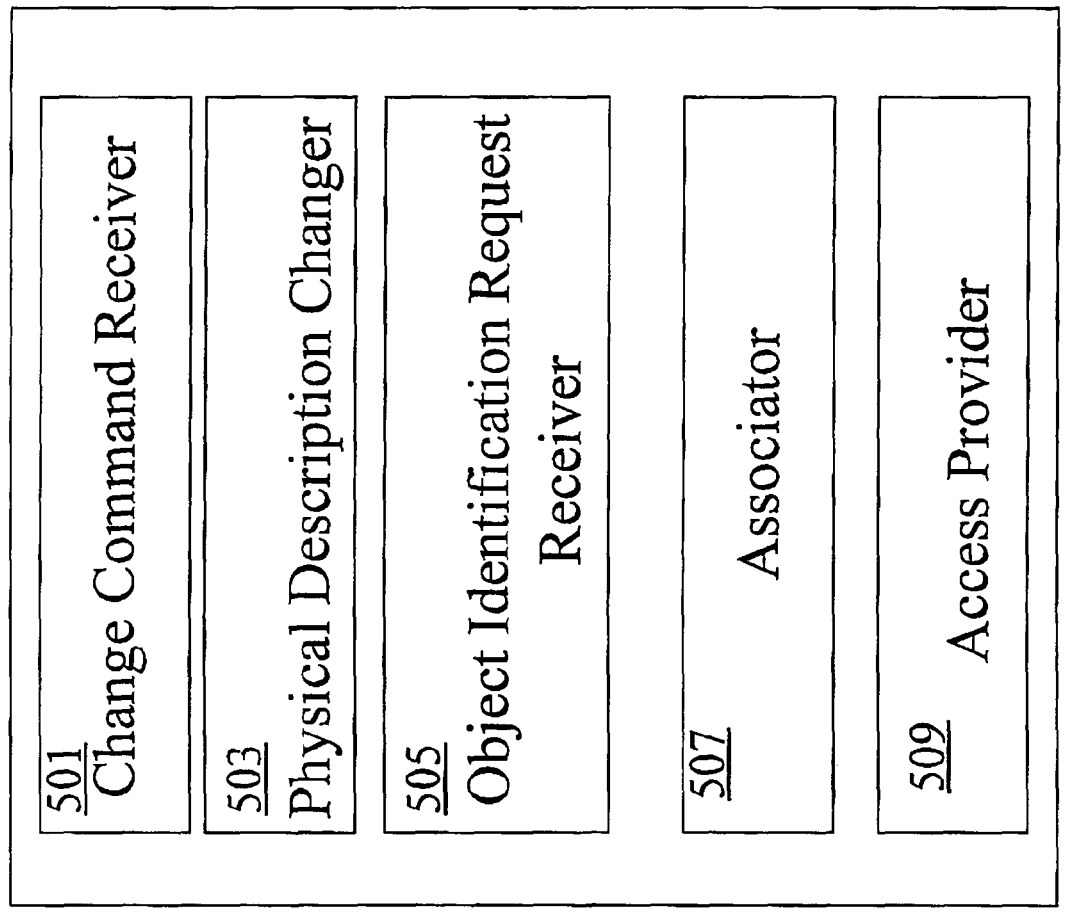
FIG. 5 shows functional components of an application independent GUI map according to one embodiment of the present invention.

Application Independent GUI Map According to One Embodiment of the Present Invention FIG. 5 shows functional components of an application independent GUI map 500 according to one embodiment of the present invention. In one embodiment, the application independent GUI map allows the testing of any application by enabling the identification of objects in any application under test using a single map. In one embodiment, the physical description of individual objects in a GUI map used by test drivers to identify objects in an application under test in the execution of the operations of keywords of test cases can be changed in real time thus enabling the GUI map to provide a physical description of any object in any application. In the FIG. 5 embodiment, system 500 includes change command receiver 501, physical description changer 503, location request receiver 505, associator 507 and access provider 509.

Referring to FIG. 5, as a part of system operations, change command receiver 501 receives commands to change a physical description associated with an object of a general class in a GUI map to a physical description of a specific object located in a GUI of a particular application. In one embodiment, the specific object is an object that is being used to execute an operation as a part of a test case.

Physical description changer 503 changes the physical description associated with the aforementioned object of a general class in a GUI map to a physical description of a specific object located in a GUI of a particular application. In one embodiment, the change enables the application independent GUI map to identify a specific object in a particular application that is under test, upon a request for an identifying physical description of the specific object.

Object identification request receiver 505 receives requests for information that can be used to identify the aforementioned specific object in the GUI of the particular application that is under test. In one embodiment, the identity of the specific object that is the subject of the request is ascertained by associator 507.

Associator 507 associates the specific object with the physical description of the specific object. The physical description of the specific object serves as an identifier of the specific object and enables the specific object to be located and utilized to execute the operations that are part of a particular keyword.

Access provider 509 provides access to the physical description of the specific object that enables an identification of the specific object in the GUI of the application under test. In one embodiment, the physical description can be provided to a test driver (e.g., SATA 209 in FIG. 2A).

In operation, initially a command to change the physical description of an object of a general class in the application independent GUI is received. The receipt of the command prompts the changing of the physical description associated in the application independent GUI with the object of a general class to be changed to a physical description of a specific object that is a part of a current application that is under test. Subsequently, a request is received that seeks the identification of the specific object in the application under test. Based on the aforementioned changing of the physical description associated in the application independent GUI with the object of a general class to that of a specific object that is a part of a current application that is under test the specific object is identified. A physical description of a specific object that identifies the object in the particular application is made accessible.

Figure 6:
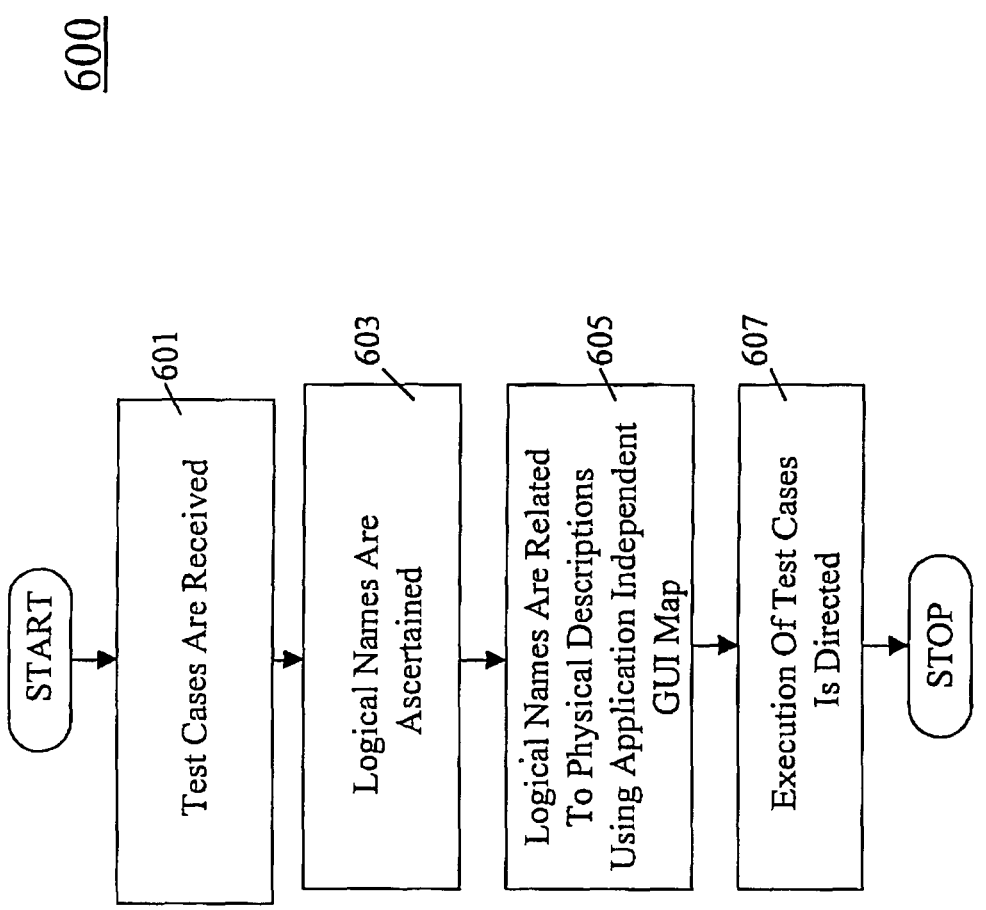
FIG. 6 shows a flowchart of a method for the automated testing of applications using an application independent GUI map according to one embodiment of the present invention.

Exemplary Operations in a Method for Automated Testing of Applications Using an Application Independent GUI Map According to Embodiments of the Present Invention FIG. 6 shows a flowchart 600 of a method for the automated testing of applications using an application independent GUI map according to one embodiment of the present invention. The flowchart includes processes of the present invention which, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 6, at step 601, a change command is received. In one embodiment, a change command receiver (e.g., 501 in FIG. 5) receives commands to change a physical description associated with an object of a general class in a GUI map to a physical description of a specific object located in a GUI of a particular application. In one embodiment, the specific object is an object that is being used to execute an operation as a part of a test case.

At step 603, the physical description associated with the aforementioned object of a general class in a GUI map is changed to a physical description of a specific object located in a GUI of a particular application. In one embodiment, a physical description changer (e.g., 503 in FIG. 5) changes the physical description associated with the aforementioned object of a general class in a GUI map to a physical description of a specific object located in a GUI of a particular application. In one embodiment, the change enables the application independent GUI map to identify a specific object in a particular application that is under test, upon a request for an identifying physical description of the specific object.

At step 605, request for information that can be used to identify the specific object in the GUI of the particular application is received. In one embodiment, an object identification request receiver (e.g., 505 in FIG. 5) receives requests for information that can be used to identify the aforementioned specific object in the GUI of the particular application that is under test. In one embodiment, the identity of the specific object that is the subject of the request is ascertained by associator 507.

At step 607, the specific object is associated with the physical description of the specific object. In one embodiment, associator (e.g., 507 in FIG. 5) associates the specific object with the physical description of the specific object. The physical description of the specific object serves as an identifier of the specific object and enables the specific object to be located and utilized to execute the operations that are part of a particular keyword.

At step 607, access is provided to the physical description of the specific object. In one embodiment, access provider (e.g., 509 in FIG. 5) provides access to the physical description of the specific object that enables an identification of the specific object in the GUI of the application under test. In one embodiment, the physical description can be provided to a test driver (e.g., SATA 209 in FIG. 2A).

Figure 7:
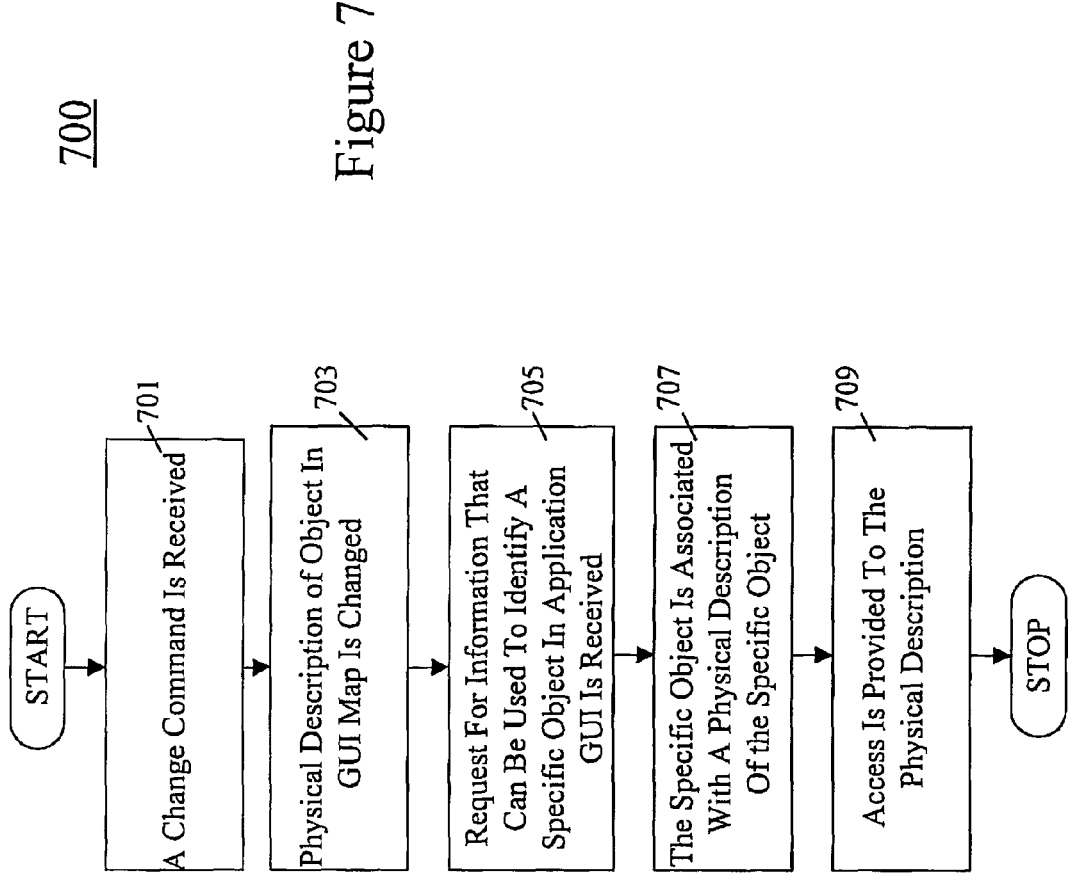
FIG. 7 shows a flowchart of a method for the automated testing of applications using an application independent GUI map according to one embodiment of the present invention.

FIG. 7 shows a flowchart 700 of a method for the automated testing of applications using an application independent GUI map according to one embodiment of the present invention.

Referring to FIG. 7, at step 701, test cases that are composed of keywords are received. In one embodiment, the test cases can correspond to one or more program applications or components thereof. In one embodiment, a test case receiver (e.g., 401 in FIG. 4) receives the test cases.

At step 703, logical names are ascertained that are a part of the test cases. In one embodiment, a logical name ascertainer (e.g., 403 in FIG. 4) ascertains the logical names that are included in the test cases. In one embodiment, the logical names are identified and then supplied to logical name relater (e.g., 405 in FIG. 4).

At step 705, the logical names are related to a general class description of objects in the application. In one embodiment, a logical name relater (e.g., 405 in FIG. 4) relates the logical names to a general class description of objects in the application using an application independent GUI map.

At step 705, the execution of each operation specified in the test cases is directed. The operations are executed using GUI objects identified with reference to a class description of the objects found in an application independent GUI map. In one embodiment, a single object in the application independent GUI map can be used in the execution of each operation that involves an object of its class in a test case.

Exemplary Hardware in Accordance with
Embodiments of the Present Invention

Figure 8:
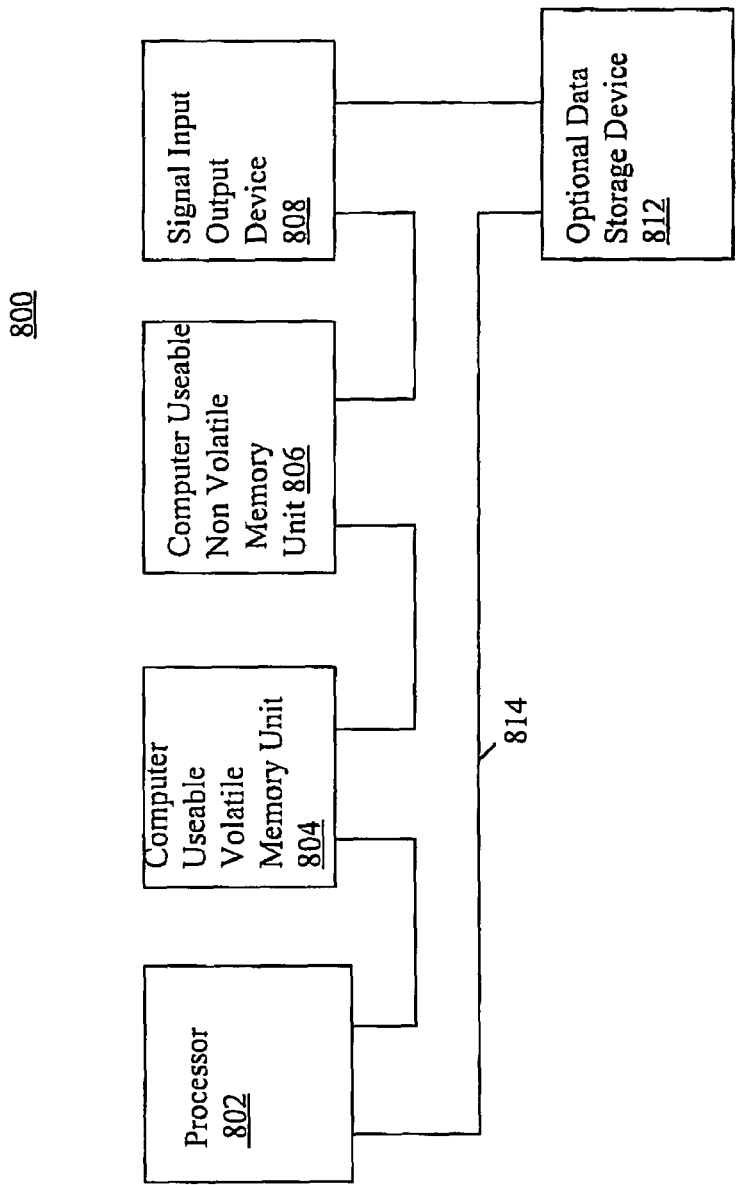
FIG. 8 is a block diagram of an exemplary computer system in accordance with embodiments of the present invention.

FIG. 8 is a block diagram of an exemplary computer system 800 in accordance with embodiments of the present invention. System 800 may be well suited to be any type of electronic computing device (e.g., server computer, embedded computing device, portable computing system etc.). Within the following discussions herein, certain processes and steps are discussed that are realized, in some embodiments, as a series of instructions (e.g., software program) that reside within computer readable memory units of computer system 800 and executed by a processor(s) of system 800. When executed, the instructions cause computer 800 to perform specific actions and exhibit specific behavior which is described in detail below. According to one embodiment, the instructions may include code that when executed perform the method for automated testing of applications using an application independent GUI map.

Computer system 800 of FIG. 8 comprises an address/data bus 814 for communicating information, one or more central processors 802 coupled with bus 814 for processing information and instructions. Central processor unit 802 may be a microprocessor or any other type of processor. The computer 800 also includes data storage features such as a computer usable volatile memory unit 804 (e.g., random access memory, static RAM, dynamic RAM, etc.) coupled with bus 814 for storing information and instructions for central processor(s) 802, a computer usable non-volatile memory unit 806 (e.g., read only memory, programmable ROM, flash memory, EPROM, EEPROM, etc.) coupled with bus 814 for storing static information and instructions for processor(s) 802. System 800 also includes one or more signal generating and receiving devices 808 coupled with bus 814 for enabling system 800 to interface with other electronic devices. The communication interface(s) 808 of the present embodiment may include wired and/or wireless communication technology such as a wireless telephone circuitry. For example, in some embodiments, the communication interface 808 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 800 may also include a computer usable mass data storage device 812 such as a magnetic or optical disk and disk drive (e.g., hard drive or floppy diskette) coupled with bus 814 for storing information and instructions.

In accordance with exemplary embodiments thereof, methods and systems for the automated testing of applications using an application independent GUI map are disclosed. A method includes receiving a command to change a physical description of an object of a general class in the GUI map. A physical description of the object of general class is changed in the GUI map to correspond to a specific object in a particular application. A request is received to identify the specific object in the particular application using a physical description of the specific object. The specific object is associated with the physical description of the specific object. Access is provided to the physical description of the specific object.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for performing an automated test of one or more applications using an application independent GUI map, said method comprising:

changing a physical description of an object of a general class of objects in said GUI map in real time to identify a specific object in a particular application of said one or more applications, wherein said general class of objects comprises a plurality of general objects that are not application dependent, wherein the general objects are mapped to the specific object independently of said particular application;

identifying a location of said specific object in said particular application using said physical description;

associating said specific object with said physical description;

selecting a predefined operation based on a keyword included in said automated test, wherein said predefined operation comprises one or more of said plurality of general objects; and operating on said specific object during said automated test using said predefined operation, wherein said automated test comprises a plurality of keywords associated with separate predefined operations of said general class of objects.

2. The method of claim 1, wherein changing said physical description comprises changing said physical description at run time of said automated test.

3. The method of claim 1, wherein changing said physical description does not affect a mapping of said plurality of general objects that are associated with an automated test of a different application.

4. The method of claim 1, wherein said general class of objects comprise a check button, edit box, link, list box, menu, object, press button, radio button, spin, tab, table and text.

5. An apparatus comprising:
   a computer readable memory unit;
   a processor coupled to said memory unit and configured to:
   change a physical description of an object of a general class of objects in a GUI map in real time, wherein said general class of objects comprises a plurality of general objects that are not application dependent, wherein the general objects are mapped to a specific object independently of said specific object, wherein a single object in the GUI map is to be used in an execution of each operation involving an object of its class in a test case;
   identify a location of said specific object in a particular application using said physical description;
   associate said specific object with said physical description; and
   test said specific object during an automated test according to a predefined operation comprising one or more of said plurality of general objects, wherein said predefined operation is associated with a keyword, and wherein said automated test is generated from a plurality of keywords associated with separate predefined operations of said plurality of general objects.

6. The apparatus of claim 5, wherein said processor is configured to change said physical description at run time of said automated test.

7. The apparatus of claim 5, wherein said plurality of general objects are independently mapped in said GUI map.

8. The apparatus of claim 5, wherein said processor is further configured to associate said plurality of general objects to said predefined operation according to a selection from said general class of objects including a check button, edit box, link, list box, menu, object, press button, radio button, spin, tab, table or text.

9. The apparatus of claim 5, wherein said processor is configured to select said predefined operation based on said keyword.

10. A system having a processor for performing an automated test of one or more applications using an application independent GUI map, said system comprising:
    means for changing a physical description of an object of a general class of objects in said GUI map in real time, wherein said general class of objects comprises a plurality of general objects that are not application dependent, wherein the general objects are mapped to a specific object independently of said one or more applications;
    means for identifying a location of said specific object in a particular application using said physical description;
    means for associating said specific object with said physical description, wherein said means for associating includes means for requesting information to be used to uniquely identify the specific object in the GUI map of the particular application; and
    means for selecting a predefined operation for testing said specific object during said automated test, wherein said predefined operation comprises one or more of said plurality of general objects, wherein said predefined operation is selected based on a keyword, and wherein said automated test comprises a plurality of keywords that define separate predefined operations of said general class of objects.

11. The system of claim 10, wherein said means for changing includes means for changing said physical description at run time of said automated test.

12. The system of claim 10, wherein changing said physical description does not affect a mapping of said plurality of general objects that are associated with an automated test of a different application.

* * * * *